(12) United States Patent
Eguchi

(10) Patent No.: US 8,811,364 B2
(45) Date of Patent: Aug. 19, 2014

(54) METHOD FOR CONTROLLING A CONTROL STATION, A METHOD FOR CONTROLLING TERMINAL STATION, A CONTROL STATION, A TERMINAL STATION, AND A COMPUTER READABLE STORAGE MEDIUM

(75) Inventor: Tadashi Eguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/620,345

(22) Filed: Sep. 14, 2012

(65) Prior Publication Data

US 2013/0010592 A1 Jan. 10, 2013

Related U.S. Application Data

(62) Division of application No. 12/124,996, filed on May 21, 2008, now Pat. No. 8,626,074.

(30) Foreign Application Priority Data

Jun. 8, 2007 (JP) ................................. 2007-152708

(51) Int. Cl.
*H04W 4/00* (2009.01)

(52) U.S. Cl.
USPC ....................................................... 370/338

(58) Field of Classification Search
CPC ....... H04W 84/12; H04W 84/18; H04W 80/04
USPC ................................................. 370/225, 338
See application file for complete search history.

(56) References Cited

U.S. PATENT DOCUMENTS

| | | | |
|---|---|---|---|
| 5,235,406 A | 8/1993 | Ishii et al. ...................... | 356/356 |
| 5,528,227 A | 6/1996 | Eguchi ........................... | 340/671 |
| 5,539,687 A | 7/1996 | Torisawa et al. ............... | 364/821 |
| 5,557,726 A | 9/1996 | Yoshizawa ...................... | 395/153 |
| 5,708,402 A | 1/1998 | Hachisu et al. ................. | 333/133 |
| 5,760,525 A | 6/1998 | Hachisu et al. ................. | 310/313 |
| 5,815,055 A | 9/1998 | Eguchi et al. .................. | 333/193 |
| 5,917,850 A | 6/1999 | Fujita et al. .................... | 375/200 |
| 6,020,672 A | 2/2000 | Yokota et al. .................. | 310/313 |
| 6,600,933 B1 | 7/2003 | Hiramatsu et al. ............. | 455/561 |
| 6,810,236 B2 | 10/2004 | Terry et al. | |

(Continued)

FOREIGN PATENT DOCUMENTS

| | | |
|---|---|---|
| CN | 1572086 | 1/2005 |
| JP | 2002-026796 | 1/2002 |

(Continued)

OTHER PUBLICATIONS

U.S. Appl. No. 11/847,098, filed Aug. 29, 2007, Applicant: Eguchi.

(Continued)

*Primary Examiner* — William D Cumming
(74) *Attorney, Agent, or Firm* — Fitzpatrick, Cella, Harper & Scinto

(57) ABSTRACT

A method for controlling a control station (H1) includes the steps of performing wireless connection processing (204) with a terminal station (D1) and when a wireless connection is established, sending, to the wirelessly-connected terminal station (D1), a capture request signal (205) for causing the terminal station to capture a control signal (202) sent by another station (H2) and to return (207) information regarding the captured control signal.

6 Claims, 10 Drawing Sheets

(56) References Cited

U.S. PATENT DOCUMENTS

| | | | |
|---|---|---|---|
| 6,934,315 B2 | 8/2005 | Suwa | 375/132 |
| 6,985,465 B2 | 1/2006 | Cervello et al. | 370/333 |
| 7,120,129 B2 | 10/2006 | Ayyagari et al. | 370/255 |
| 7,130,611 B2 | 10/2006 | Kimura et al. | 455/404.2 |
| 7,257,099 B2 | 8/2007 | Myojo | 370/329 |
| 7,756,528 B2 | 7/2010 | Yamada et al. | 455/456.1 |
| 2006/0029023 A1 | 2/2006 | Cervello et al. | |
| 2006/0281462 A1 | 12/2006 | Kim et al. | 455/436 |
| 2007/0104221 A1 | 5/2007 | Venkatachalam | 370/468 |
| 2007/0127048 A1 | 6/2007 | Minami | 358/1.12 |
| 2008/0225752 A1 | 9/2008 | Kwon et al. | 370/254 |
| 2008/0304459 A1* | 12/2008 | Eguchi | 370/338 |
| 2009/0209261 A1 | 8/2009 | Kuri et al. | |

FOREIGN PATENT DOCUMENTS

| | | |
|---|---|---|
| JP | 2002-344458 | 11/2002 |
| JP | 2004-509514 | 3/2004 |
| JP | 2005-045330 | 2/2005 |
| JP | 2006-033876 | 2/2006 |
| JP | 2006-352883 | 12/2006 |
| JP | 2007-152708 | 6/2007 |
| KR | 10-2007-0023510 | 2/2007 |
| WO | 02/23819 | 3/2002 |
| WO | 2005/088870 | 9/2005 |
| WO | 2007015529 | 2/2007 |
| WO | 2007/047502 | 4/2007 |

OTHER PUBLICATIONS

Korean Office Action dated Jan. 26, 2010 in corresponding Korean Application No. 10-2008-0052464.

European Search Report dated Jan. 4, 2011 in EP application No. 08157771.0.

G. Cervello, et al., "Dynamic Channel Selection (DCS) Scheme for 802.11", IEEE 802.11—00/195 (Jul. 2000).

A. Mishra, et al., "A Client-Driven Approach for Channel Management in Wireless LANs". IEEE (2006).

C. Wong, et al. "PACA: Peer-Assisted Channel Assignment for Home Wireless LANs". IEEE (2006).

Chinese Office Action dated Mar. 19, 2012 from related Chinese Patent Appl No. 2008-10111123.7 with English Translation.

\* cited by examiner

METHOD FOR CONTROLLING A CONTROL STATION, A METHOD FOR CONTROLLING TERMINAL STATION, A CONTROL STATION, A TERMINAL STATION, AND A COMPUTER READABLE STORAGE MEDIUM

This application is a divisional of U.S. Patent Application Ser. No. 12/124,996, filed May 21, 2008, the contents of which are incorporated by reference herein.

BACKGROUND OF THE INVENTION

1. Field of the Invention

The present invention relates to methods for controlling a control station, methods for controlling a terminal station, a control station, a terminal station, and a computer readable storage medium.

2. Description of the Related Art

In recant years, products that employ wireless-communication schemes, such as IEEE 802.11 wireless LANs (Local Area Network) and wireless USB (Universal Serial Bus), are emerging.

As a control method for wireless-communication systems, there is a method in which the control station of each network controls communication with the terminal stations belonging to their own respective networks. Under such wireless-communication systems, the control station periodically sends a control signal such as a beacon, and each terminal station performs various controls for wireless communication based on the received control signal. Examples include the case where a terminal station communicates with another terminal station that is located on the same network using wireless-communication parameters included in the received control signal (see Japanese Patent Laid-Open No. 2002-344458), and the case where data communication is performed using a bandwidth assigned by the control signal (Japanese Patent Laid-Open No. 2005-04530).

However, terminal stations are not always in a location in which they can communicate with only a control station with which they desire to communicate. For example, there is a case where a terminal station D1, which communicates with a control station H1 of a first network, is in a location in which it can also receive signals from a control station H2 of a second network. The control station H1 and the control station H2 periodically send a beacon (control signal) for controlling communication with the terminal station belonging to the first and second network.

Here, if the control station H1 is in a location in which it cannot communicate wish the control station H2, the control station H1 cannot recognize the presence of the second network. Consequently, the signals sent/received over the second network may act as interference signals during data transmission from the control signal H1 to the terminal station D1.

SUMMARY OF THE INVENTION

The present invention allows a control station to recognize, at an appropriate time, the existence of a communication environment beyond the communication range of the control station.

According to one aspect of the present invention, a method for controlling a control station, at the control station, crises the steps of:

determining a wireless communication status with a terminal station; and sending, based on the wireless communication status, a capture request signal to cause the terminal station to capture a control signal sent by another station and to return information regarding the captured signal.

According to another aspect of the present invention, a method for controlling a terminal station, at the terminal station, comprises the steps of:

determining a wireless communication status of the terminal station; and based on the wireless communication status, sending, to a control station, a signal for causing the control station to send a capture request signal, wherein the capture request signal is transmitted for causing the terminal station to capture a control signal sent by another station and to return information regarding the captured control signal, to the control station.

According to still another aspect of the present invention, a control station comprises:

a determining unit adapted to determine a wireless communication status with a terminal station; and a sending unit adapted to send, based on the wireless communication status, a capture request signal to cause the terminal station to capture a control signal sent by another station and to return information regarding the captured signal.

According to yet another aspect of the present invention, a terminal station comprises:

a determining unit adapted to determine a wireless communication status of the terminal station; and a sending unit adapted to send, to a control station, a signal for causing the control station to send a capture request signal based on the wireless communication status, wherein the capture request signal is transmitted for causing the terminal station to capture a control signal sent by another station and to return to the control station information regarding the captured control signal.

Further features of the present invention will become apparent from the following description of exemplary embodiments with reference to the attached drawings.

DESCRIPTION OF THE EMBODIMENTS

<Embodiment 1>

Embodiment 1 of the present invention shall be described with reference to FIGS. 1 to 3.

Figure 1:
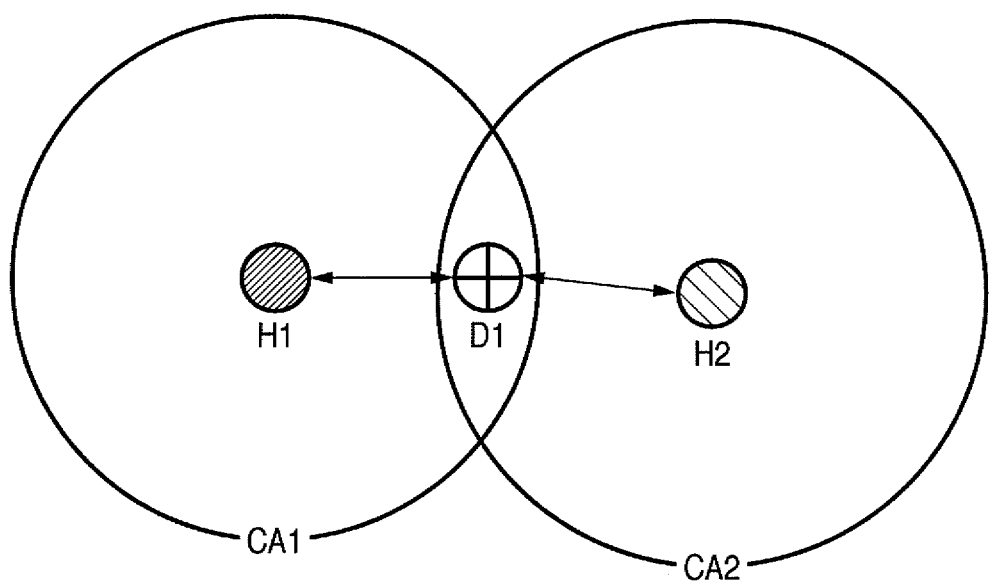
FIG. 1 is a diagram illustrating an arrangement of wireless stations according to embodiments of the or invention.

FIG. 1 is a diagram illustrating an arrangement of wireless stations according to Embodiment 1.

H1 and H2 denote wireless-communication control stations, and D1 denotes a terminal station. The terminal station D1 communicates with the control station H1 based on various information included in a beacon (control signal) that is sent periodically from the control station H1. The beacon includes information such as a bandwidth as for data transmission from the control station H1 to the terminal station D1, a bandwidth assigned for data transmission from the terminal station D1 to the control station H1, and the like, and the terminal station D1 performs data communication using the assigned bandwidths. The control station H2, on the hand, is a control station that does not communicate with the terminal station D1, and periodically sends a beacon to a terminal station (not shown) located on its own communication range. This beacon includes information such as a bandwidth assigned for data transmission from the control station H2 to a terminal station that is located on the communication range of the control station H2, and a bandwidth assigned for data transmission from the terminal station located on the communication range of the control station H2 to the control station H2. Note that the term "bandwidth" used in the present embodiment and the following embodiments refers to a time interval (time slot) used for communication.

CA 1 and CA 2 indicate communication ranges of the control stations H1 and P2, respectively. As illustrated in FIG. 1, the control at H1 cannot receive beacons sent by the control station H2, and the control station H2 cannot receive beacons sent by the control station H1. The terminal station D1 is in a location in which it can receive beacons from both control stations H1 and H2.

Figure 2:
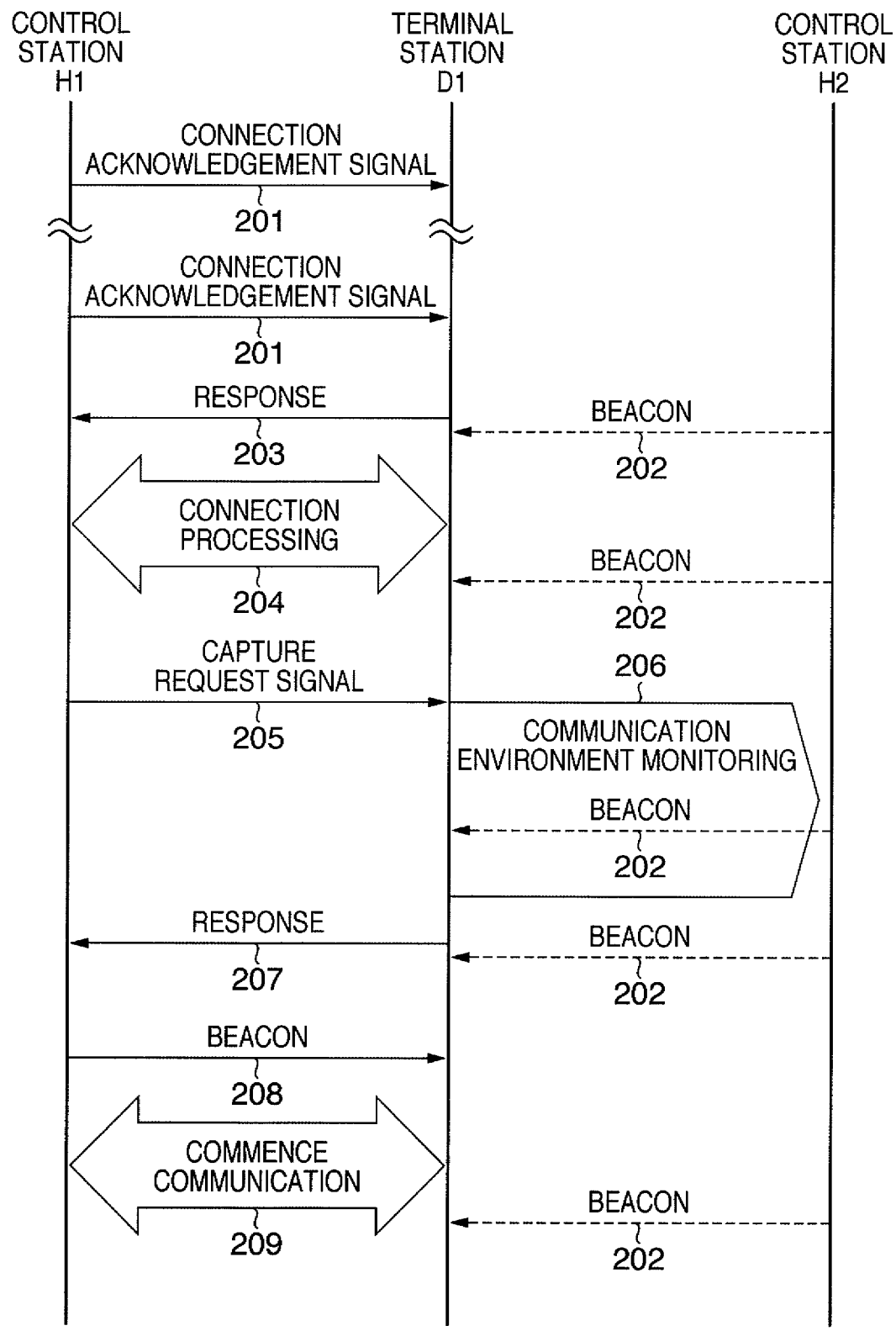
FIG. 2 is a diagram illustrating a sequence executed by wireless stations according to a first embodiment of the present invention.

FIG. 2 is a diagram illustrating an example of a sequence according to the present embodiment.

The control station H1 periodically sends a connection authorization signal for allowing the terminal station to wirelessly connect to the control station H1 (201). The control station H2 periodically sends a beacon (202). The terminal station D1 is in a location in which the terminal station D1 can also receive beacons from the control station H2. Upon receiving the connection authorization signal (201) sent by the control station H1, the terminal station D1 returns a response (203) to the connection authorization signal (201) in order to commence communication with the control station H1. Upon receiving the response, the control station H1 commences connection processing for connecting to the terminal station D1 (204).

In the present embodiment, a wireless connection is established after the terminal station has returned a response to the connection authorization signal from the control station. However, in the present invention, the connection processing method is not limited to any particular method. It is also possible to establish a wireless connection, or example, after the control station has returned a response to a connection request having been sent by the terminal station, as in an THEE 802.11 wireless LAN. It is also possible to perform an authentication process before the connection processing.

After the connection processing for connecting to the terminal station D1 is completed (204), the control station H1 sends, to the terminal station D1, a signal (hereinafter referred to as "capture request signal") for causing the terminal station D1 to capture a beacon sent by another station and return information regarding the captured beacon (205). The information returned includes the content of the beacon received by the terminal station D1 within the period specified by the capture request signal, the timing at which the beacon was received, and the quality of the reception.

Upon receiving the capture request signal, the terminal station D1 captures a beacon sent by another station, and monitors the communication environment (206). In the present embodiment, the terminal station D1 receives a beacon (202) sent by the control station H2, and returns information regarding the received beacon to the control station H1 (207).

The control station H1 arranges a bandwidth in which the control station H1 sends beacons and data to the terminal station D1 based on the information returned from the terminal station D1 such that the bandwidth does not overlap with the bandwidth in which the control station H2 sends beacons. The control station H1 then sends a beacon containing information regarding the arranged bandwidth to the terminal station D1 (208), and commences wireless communication with the terminal station D1 that has received the beacon (209).

In this manner, the control station H1 causes the terminal station D1 to monitor the surrounding communication environment before commencing wireless communication, whereby the control station H1 can recognize the presence of another station that is not located on its own communication range, but in the communication range of its communication partner, the terminal station D1. Accordingly, the control station cart assign a communication bandwidth such that the signals sent from the another station do not act as interference signals in the data communication between the control station H1 and the terminal station D1. In other words, it is possible to prevent the beacons and data sent from the control station H1 to the terminal station D1 from colliding with the beacons sent from the control station H2.

When the control station H1 recognizes, from the information returned from the terminal station D1, that the control station H2 is located on a range in which the control station H2 can communicate with the terminal station D1, the control station H1 may cause the terminal station D1 to send a notification signal that enables the control station 112 to recognize the bandwidth used by the control station H1 and the terminal station D1. The control station H2 can recognize the bandwidth used for the communication between the control station H1 and the terminal station D1 by receiving the notification signal sent from the terminal station D1, and thus the control station H2 can assign an appropriate bandwidth as well.

Figure 3:
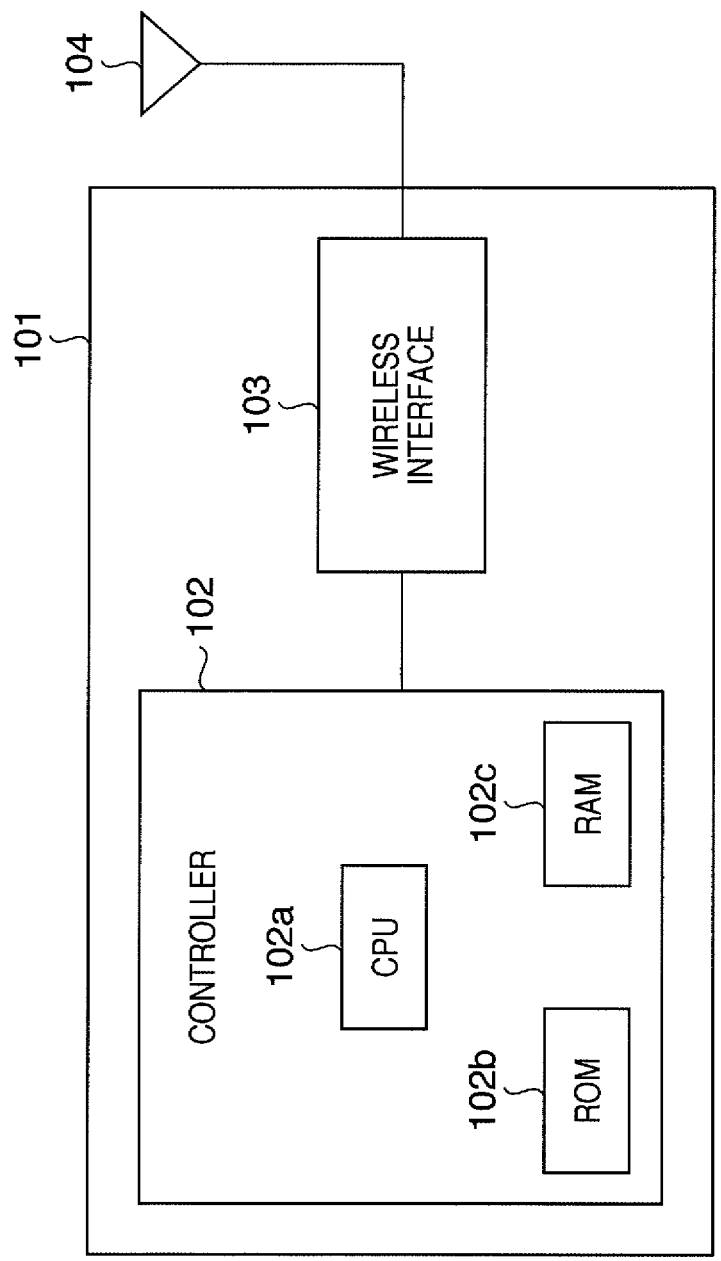
FIG. 3 is a diagram illustrating an internal configuration of a wireless station according to embodiments of the present invention.

FIG. 3 is a block diagram illustrating a configuration of a wireless-communication apparatus 101 provided in each wireless station. If the control station H1 is a printer, for example, the control station H1 can have a wireless-communication function in addition to a printing function by incorporating the wireless-communication apparatus 101.

A controller 102 of the wireless-communication apparatus 101 performs various controls as shall be described below.

A CPU 102a performs wireless-communication control by executing a control program stored in a ROM 102b.

The control station has a function for performing connection processing with a terminal station and communicating with the terminal station, and a function for sending a capture request signal to the terminal station and analyzing the communication environment surrounding the terminal station from the content of the response to the capture request signal. The control station also has a function for generating a beacon including information regarding a bandwidth assigned for data communication and sending the beacon. The control station further has a function for transmitting data to the terminal station based on the bandwidth information included in the beacon, and a function for determining whether or not the data transmission is successful by the success or failure of Ack (acknowledgment signal) reception.

The control station further has a function for receiving data from the terminal station based on the bandwidth information included in the beacon if the control station receives data successfully, the control station further has a function for returning an Ack, and a function for determining whether or not the Ack signal transmission is successful by retransmitting data from the terminal station.

Meanwhile, the terminal station has a function for performing connection processing with a control station and communicating with the control station, and a function for capturing a beacon sent by another station upon receiving a capture request signal from the control station and returning information regarding the captured beacon. The terminal station also has a function for receiving data based on bandwidth information included in the beacon sent from the control station, and a function for returning an Ack if it has received the data successfully.

The terminal station also has a function for transmitting data based on the bandwidth information included in the beacon sent from the control station. Furthermore, the terminal station has a function for determining whether or not the data transmission is successful by the success or failure of Ack reception, and a function for retransmitting data if the Ack reception has failed.

A RAM 102c provides a working area or the like used when the CPU 102a executes various controls. A wireless interface 103 wirelessly sends a transmission signal output from a controller through an antenna 104, and converts a wireless signal received through the antenna 104 to a digital signal that can be processed by the controller 102.

Figure 4:
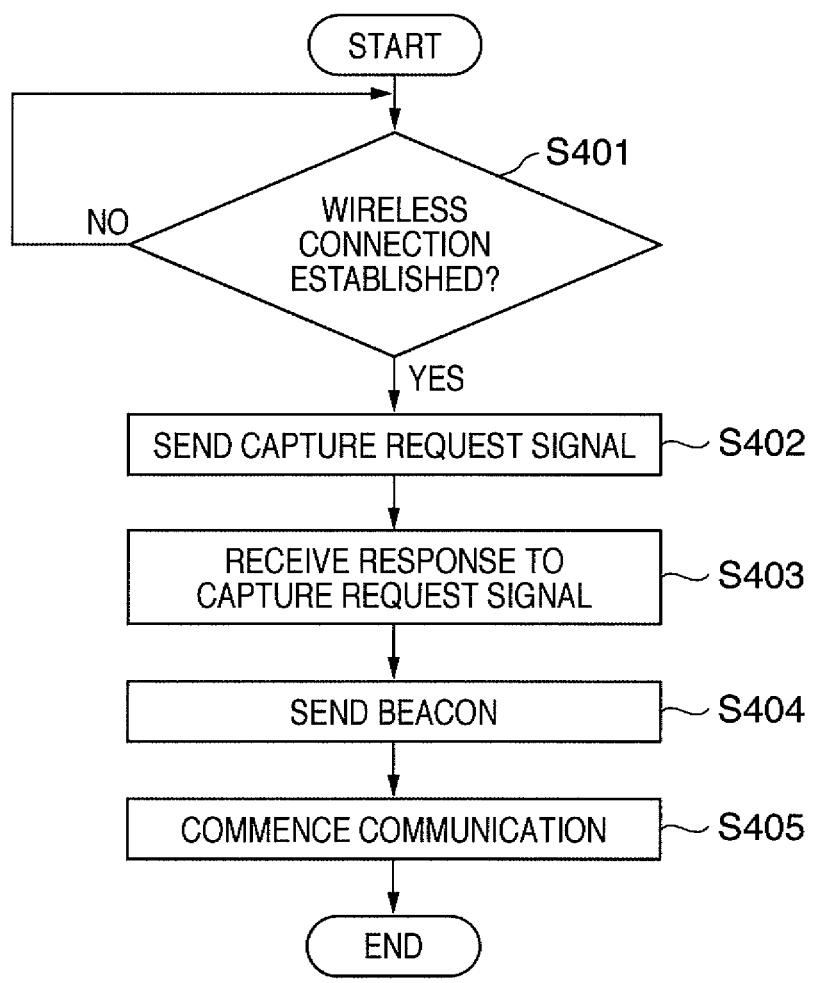
FIG. 4 is a diagram illustrating an operation flow performed by a control station H1 according to Embodiment 1 of the present invention.

FIG. 4 is a diagram illustrating an operation flow performed by the control station H1 according to the present embodiment.

Upon establishing a wireless connection with the terminal station D1 (Yes in S401), the control station H1 sends a capture request signal to the terminal station D1 (S402). Upon receiving a response to the capture request signal (S403), the control station H1 arranges a bandwidth assigned for the data communication with the terminal station D1 based on the information returned from the terminal station D1. Then, the control station H1 sends a beacon including information regarding the assigned bandwidth (S404), and commences data communication with the terminal station D1 that has received the beacon (S405).

As described above, according to the present invention, the control station sends a capture request signal to the terminal station when a wireless connection with the terminal station is established. The control station then performs control on a bandwidth for use in data communication with the terminal station based on the information returned in response to the capture request signal. Accordingly, even if another station is located on a range in which the control station cannot communicate, it is possible to suppress degradation in the data communication quality due to an interference signal originating from that station.

<Embodiment 2>

Embodiment 2 of the present invention shall be described next. Since the arrangement of wireless stations and the block diagram illustrating a configuration of a wireless-communication apparatus provided in each wireless station are the same as those in Embodiment 1 (FIGS. 1 and 3), descriptions thereof are omitted here.

Figure 5:
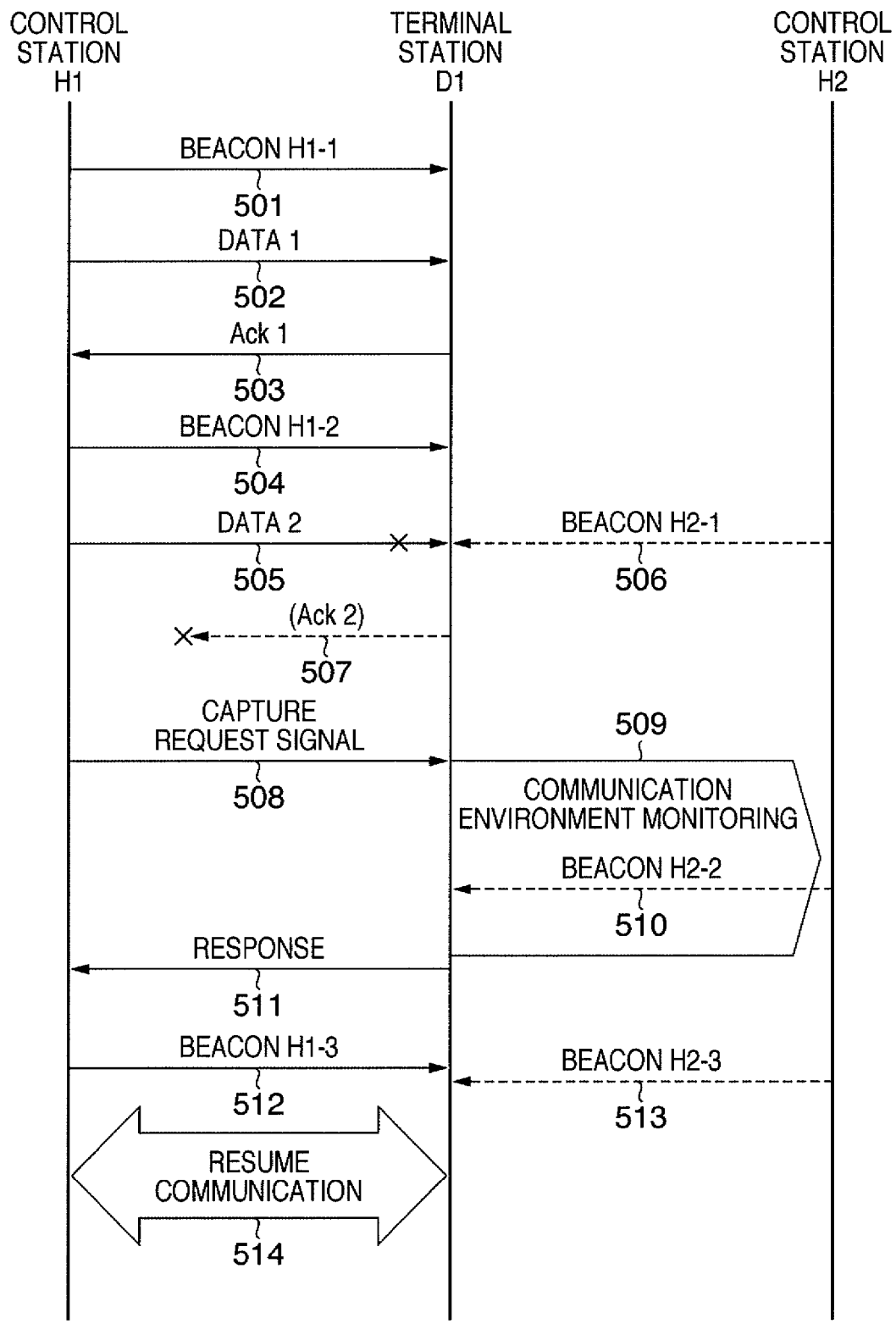
FIG. 5 is a diagram illustrating a sequence executed by wireless stations according to a second embodiment of the present invention.

FIG. 5 is a diagram illustrating an example of a sequence according to the present embodiment. FIG. 5 illustrates a situation in which the control station sends a capture request signal when the control station cannot receive an ACE from the terminal station after the control station has sent data to she terminal station.

The control station H1 periodically sends a beacon (501, 504). The beacon includes information such as a bandwidth assigned for data transmission from the control station H1 to the terminal station D1, a bandwidth assigned for data transmission from the terminal station D1 to the control station H1, and the like. The control station H1 and the terminal station D1 perform data communication based on the bandwidth information (502, 503, 505, 507).

First, based on the bandwidth information included in a beacon H1-1 (501), data 1 is sent from the control station H1 to the terminal station D1 (502). Upon receiving the data 1, the terminal station D1 sends an ACK 1 to the control station H1 (503).

Next, based on the bandwidth information included in a beacon H1-2 (504), data 2 is sent from the control station H1 to the terminal station D1 (505). Here, it is assumed that the data 2 has collided with a beacon H2-1 sent from the control station H2 (506), and the terminal station D1 could not properly receive the data 2. Consequently, the terminal station D1 does not send an ACE 2 to the control station H1 (507).

If the control station H1 cannot receive an Ack 2 for a predetermined period of time, the control station H1 sends a capture request signal to the terminal station D1 (508). Upon receiving the capture request signal, the terminal station D1 captures a beacon sent by another station, and monitors the communication environment (509). In the present embodiment, the terminal station D1 receives a beacon. H2-2 (510) sent by the control station H2, and returns information regarding the received beacon to the control station H1 (511).

The control station H1 arranges a bandwidth in which the control station in sends beacons and data to the terminal station D1 based on the information returned from the terminal station D1 such that the bandwidth does not overlap with a bandwidth in which the control station H2 sends beacons (506, 510, 513). The control station H1 sends a beacon H1-3 that includes information regarding the arranged bandwidth to the terminal station D1 (512), and resumes wireless communication with the terminal station D1 that has received the beacon H1-3 (514).

When the control station H1 recognizes from the information returned from the terminal station D1, that the control station H2 is located on a range in which the control station H2 can communicate with the terminal station D1, the control station H1 may cause the terminal station D1 to send a notification signal that allows the control station H2 to recognize the bandwidth used by the control station H1 and the terminal station D1. The control station H2 can recognize the bandwidth used for the communication between the control station H1 and the terminal station D1 by receiving the notification signal sent by the terminal station D1, and thus the control station H2 can assign an appropriate bandwidth as well.

As described above, when the control station H1 cannot receive an ACK, it causes the terminal station D1 to monitor the surrounding communication environment, whereby the control station. H1 can recognize the presence of another station that is not located on its own communication range, but is located on the communication range of its communication partner, the terminal station D1. Accordingly, even if the control station H1 cannot detect the fact that a data collision has occurred with the terminal station D1, the control station H1 can perform control to assign a communication bandwidth such that no data collision occurs after that. Normally, the control station H1 retransmits data when it did not receive an ACK, but if data collisions occur continuously in the terminal station, the repeated transmission can result in a waste of bandwidth. However, the control according to the present embodiment, makes it possible not only to avoid data collisions immediately but also to effectively utilize bandwidth.

Figure 6:
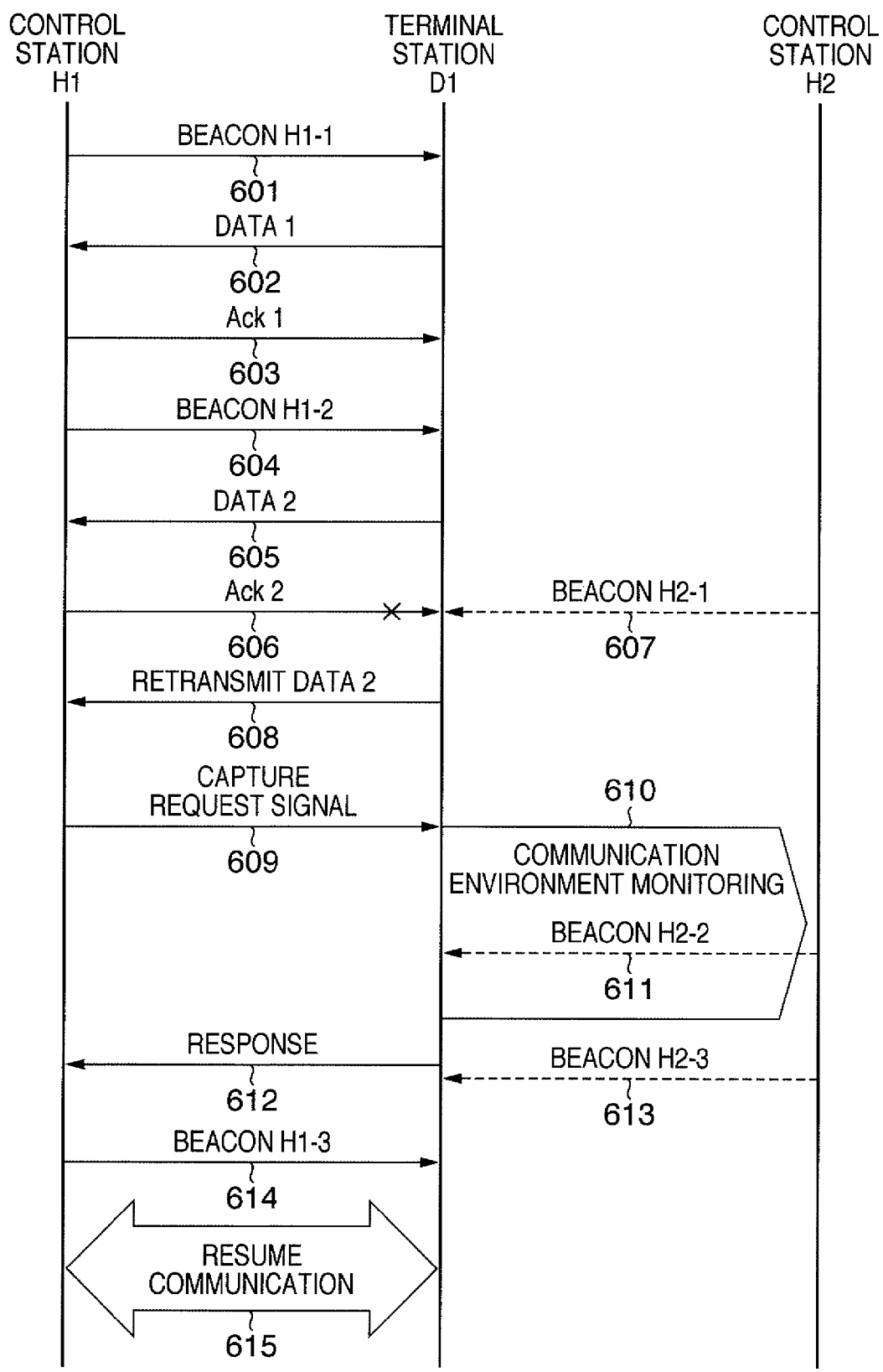
FIG. 6 is a diagram illustrating another sequence executed by wireless stations according to the second embodiment of the present invention.

FIG. 6 is a diagram illustrating an example of a sequence according to the present embodiment. FIG. 6 illustrates a situation in which the control station sends a capture request signal when data is retransmitted despite the fact that the control, station has sent an ASK in response to the data received from the terminal station.

The control station H1 periodically sends a beacon (601, 604). The beacon includes information such as a bandwidth assigned for data transmission from the control station H1 to the terminal station D1, and a bandwidth assigned for data transmission from the terminal station D1 to the control station H1. The control station H1 and the terminal station D1 perform data communication based on the bandwidth information (602, 603, 605, 606).

First, based on the bandwidth information included in a beacon H1-1 (601), data 1 is sent from the terminal station D1 to the control station H1 (602). Upon receiving the data 1, the control station H1 sends an ACK 1 to the terminal station D1 (603).

Next, based on the bandwidth information included in a beacon H1-2 (604), data 2 is sent from the terminal station D1 to the control station 51 (605). Upon receiving the data 2, the control station H1 sends an ASK 2 to the terminal station D1 (606). At this time, it is assumed that the ACK 2 has collided with a beacon H2-1 (607) sent from the control station H2, and the terminal station D1 could not receive the ACK 2 properly.

Because the terminal station D1 could not receive the ACK 2 properly, it transmits the data 2 again to the control station (608). If the control station H1 detects that the data 2 has been retransmitted despite the fact that the control station H1 returned the ACE 2, the control station H1 sends a capture request signal to the terminal station D1 (609). Upon receiving the capture request signal, the terminal station D1 captures a beacon sent by another station, and monitors the communication environment (610). In the present embodiment, the terminal station D1 receives a beacon H2-2 (611) sent by the control station H2, and returns information regarding the received beacon to the control station H1 (612).

The control station H1 arranges a bandwidth in which the control station H1 sends beacons and data to the terminal station D1 based on the information returned from the terminal station D1 such that the bandwidth does not overlap with a bandwidth in which the control station H2 sends beacons (607, 611, 513). The control station H1 then sends a beacon H1-3 including information regarding the arranged bandwidth to the terminal station D1 (614), and resumes wireless communication with the terminal station D1 that has received the beacon H1-3 (615).

When the control station H1 recognizes, from the information returned, from the terminal station D1, that the control station H2 is located on the range in which the control station H2 can communicate with the terminal station D1, the control station H1 may cause the terminal station D1 to send a notification signal that allows the control station H2 to recognize the bandwidth used by the control station and the terminal station D1. The control station 52 can recognize the bandwidth used for the communication between the control station H1 and the terminal station D1 by receiving the notification signal sent by the terminal station D1, and thus the control station 112 can assign an appropriate bandwidth as well.

As described above, when data is retransmitted despite the fact that the control station H1 has sent an ACK, the control station H1 causes the terminal station D1 to capture a beacon sent from another station, whereby the control station H1 can recognize the presence of another station that is not located on its own communication range, but in the communication range of its communication partner, the terminal station D1. Accordingly, even if the control station H1 cannot detect the fact that a data collision has occurred with the terminal station D1, the control station H1 can perform control to assign a communication bandwidth such that no data collision occurs after that.

Figure 7:
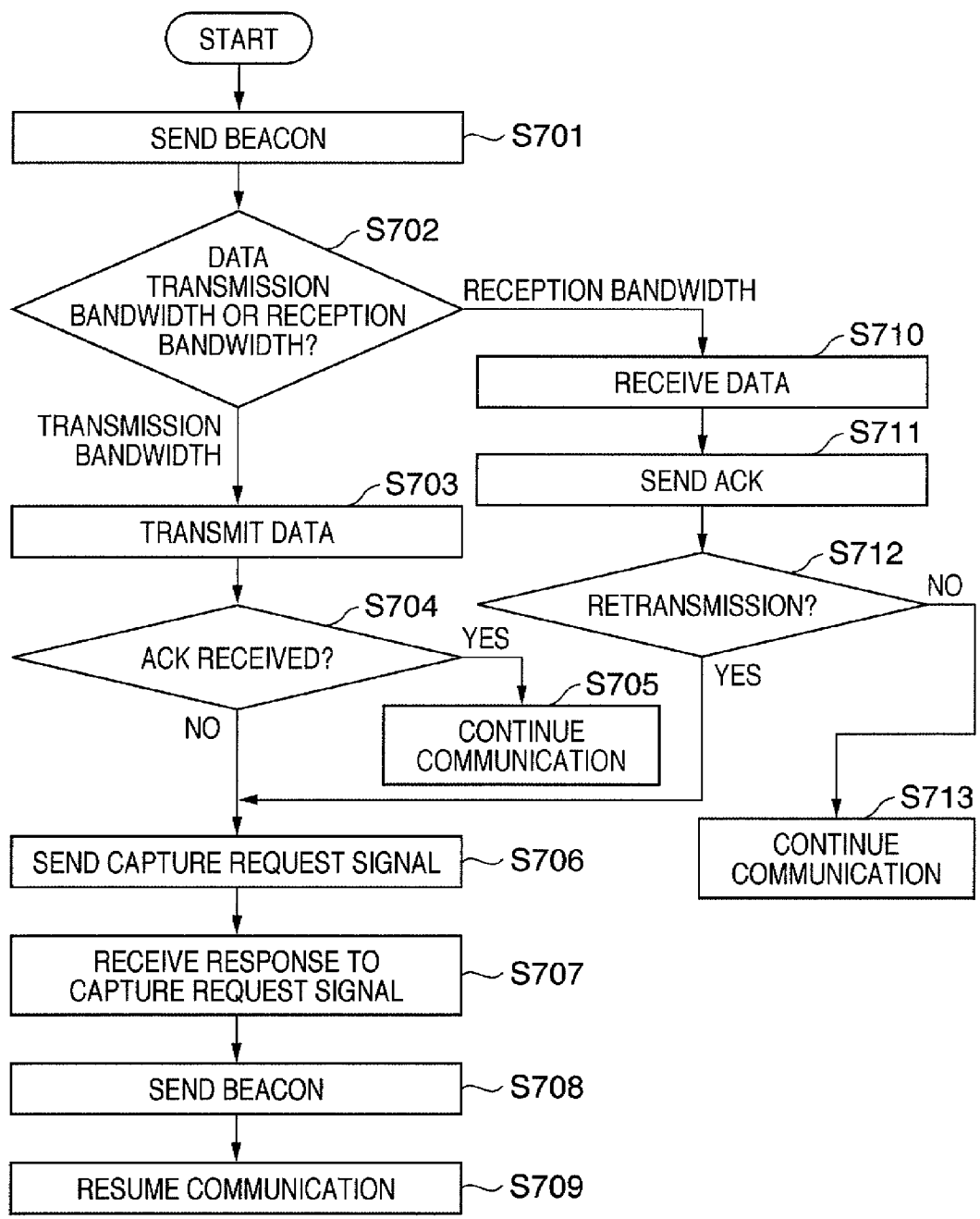
FIG. 7 is a diagram illustrating an operation flow performed by a control station accord in to the second embodiment of the present invention.

FIG. 7 is a diagram illustrating an operation flow performed by the control station H1 according to the present embodiment.

The control station H1 periodically sends a beacon including information regarding a bandwidth to be assigned for data communication with the to station D1 (S701). After having sent the beacon, the control station H1 determines whether the bandwidth is a bandwidth for data transmission or a bandwidth for data reception (S702). The control station H1 then sends data to the terminal station D1 (S103), or receives data from the terminal station D1 (S710) depending on the results of the determination.

If the control station H1 has sent data to the terminal station D1 (S703), it waits for an ACK from the terminal station D1 for a predetermined period of time. If the control station H1 receives an ACK (Yes in S704), the control station H1 continues to communicate with the terminal station D1 (S705).

If the control station H1 does not receive an ACK for as predetermined period of time (No in S704), the control station H1 sends a capture request signal to the terminal station D1 (S706). Upon receiving a response to the capture request signal from the terminal station D1 (S707), the control station H1 arranges a bandwidth to be assigned for data communication with the terminal station D1 based on the information returned by the terminal station D1. Then, the control station H1 sends a beacon including information regarding the arranged bandwidth (S708), and tea ones a data communication with the terminal station D1 that has received the beacon (S709).

If the control station H1 has received data from the terminal station D1 (S710), the control station H1 sends an ACK to the terminal station D1 (S711). If the data is retransmitted from the terminal station D1 after the control station H1 has sent the ACK (Yes in S712), the control station H1 sends a capture request signal to the terminal station D1 (S706). The process after S707 is the same as the process described above, and therefore descriptions thereof shall be omitted here. If the control station H1 does not receive the retransmission data (No in S712), the control station H1 continues to communicate with the terminal station D1 (S713).

In the foregoing, in S704, the control station H1 sends a capture request signal immediately after it did not receive a single ASK, but it is also possible for the control station H1 to send a capture request signal after it did not receive a predetermined number of ACKs after attempting to transmit the data several times. Similarly, in S712, it is also possible for the control, station H1 to send a capture request signal after attempting to send several ACKs and receiving retransmission data a predetermined number of times, rather than immediately after it has received retransmission data only once. It is thereby possible to prevent unnecessary capture request signals from being sent when the transmission/reception of an ACK is unsuccessful due not to a data collision in the terminal station D1, but due, rather, to an error in the control station H1 or the like.

As described above, if the control station cannot receive an ACK from the terminal station after transmitting data to the terminal station, or if data is retransmitted despite the fact that the control station sent an ACK to the terminal station when receiving data from the terminal station, the control station sends a capture request signal to the terminal station. The control station then performs control on a bandwidth used for data communication with the terminal at based on the information returned in response to the capture request signal. Accordingly, even when another station is located on a range in which the control station cannot communicate, it is possible to suppress degradation in the data communication quality due to an interference signal originating from that station.

<Embodiment 3>

Embodiment 3 of the present invention shall be described next. Since the arrangement of wireless stations is the same as that of Embodiment 1 (FIG. 1), descriptions thereof shall be omitted here. The block diagram, illustrating a configuration of a wireless-communication apparatus provided in each wireless station is the same as that of Embodiment 1, except that the functions described below are added in the present embodiment.

The terminal station D1 is further provided with a function for sending a signal (hereinafter "command 1") for causing the control station H1 to send a capture request signal.

The control station H1, meanwhile, is further provided with a function for sending a capture request signal upon receiving the command 1 from the terminal station D1.

Figure 8:
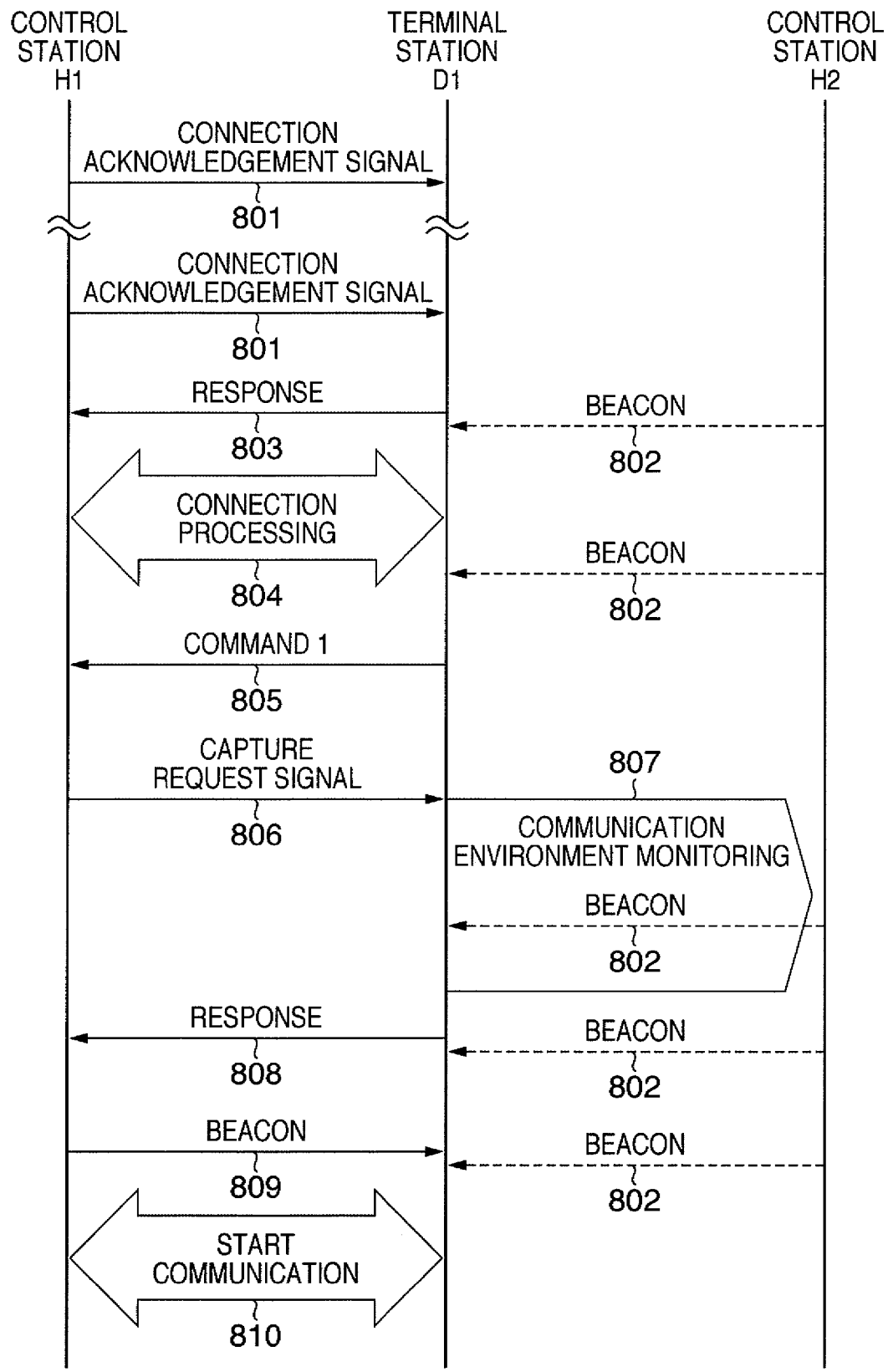
FIG. 8 is a diagram illustrating a sequence executed by wireless stations according to a third embodiment of the present invention.

FIG. 8 is a diagram illustrating an example of a sequence according to the present embodiment.

The control station H1 periodically sends a connection authorization signal for allowing the terminal station to wirelessly connect to the control station H1 (801). The control station H2 also periodically sends a beacon (802). The terminal station D1 is in a location in which it can also receive the beacon from the control station H2. Upon receiving the connection authorization signal (801) sent by the control station H1, the terminal station D1 sends a response (803) to the connection authorization signal (801) to communicate with the control station H1. Upon receiving the response, the control station H1 commences connection processing for connecting to the terminal station D1 (804).

In the present embodiment, a wireless connection is established after the terminal station has returned a response to the connection authorization signal from the control station. However, in the present invention, the connection processing method is not limited to any particular method. It is also possible to establish a wireless connection, for example, after the control station has returned a response to a connection request having been sent by the terminal station, as in an IEEE802.11 wireless LAN. It is also possible to perform an authentication process before the connection processing.

After the connection processing for connecting to the control station H1 is completed (804), the terminal station D1 sends a command 1 to the control station H1 (805). Upon receiving the command 1, the control station H1 sends a capture request signal to the terminal station D1 (806).

Upon receiving the capture request signal, the terminal station D1 captures a beacon sent by another at and monitors the communication environment (907). In the present embodiment, the terminal station D1 receives a beacon (802) sent by the control station H2, and returns information regarding the received beacon to the control station H1 (808).

The control station H1 arranges a bandwidth in which the control station H1 sends beacons and data to the terminal station D1 based on the information returned from the terminal station D1 such that the bandwidth does not overlap with a bandwidth in which the control station H2 sends beacons. The control station H1 then sends a beacon containing information regarding the arranged bandwidth to the terminal station D1 (809), and commences wireless communication with the terminal station D1 that has received the beacon (810).

In this manner, the terminal station D1 sends a command 1 to the control station H1 after a wireless connection with control station H1 is established, and the control station H1 sends a capture request signal in response to the command 1. Consequently, effects similar to those of Embodiment 1 can be attained.

Figure 9:
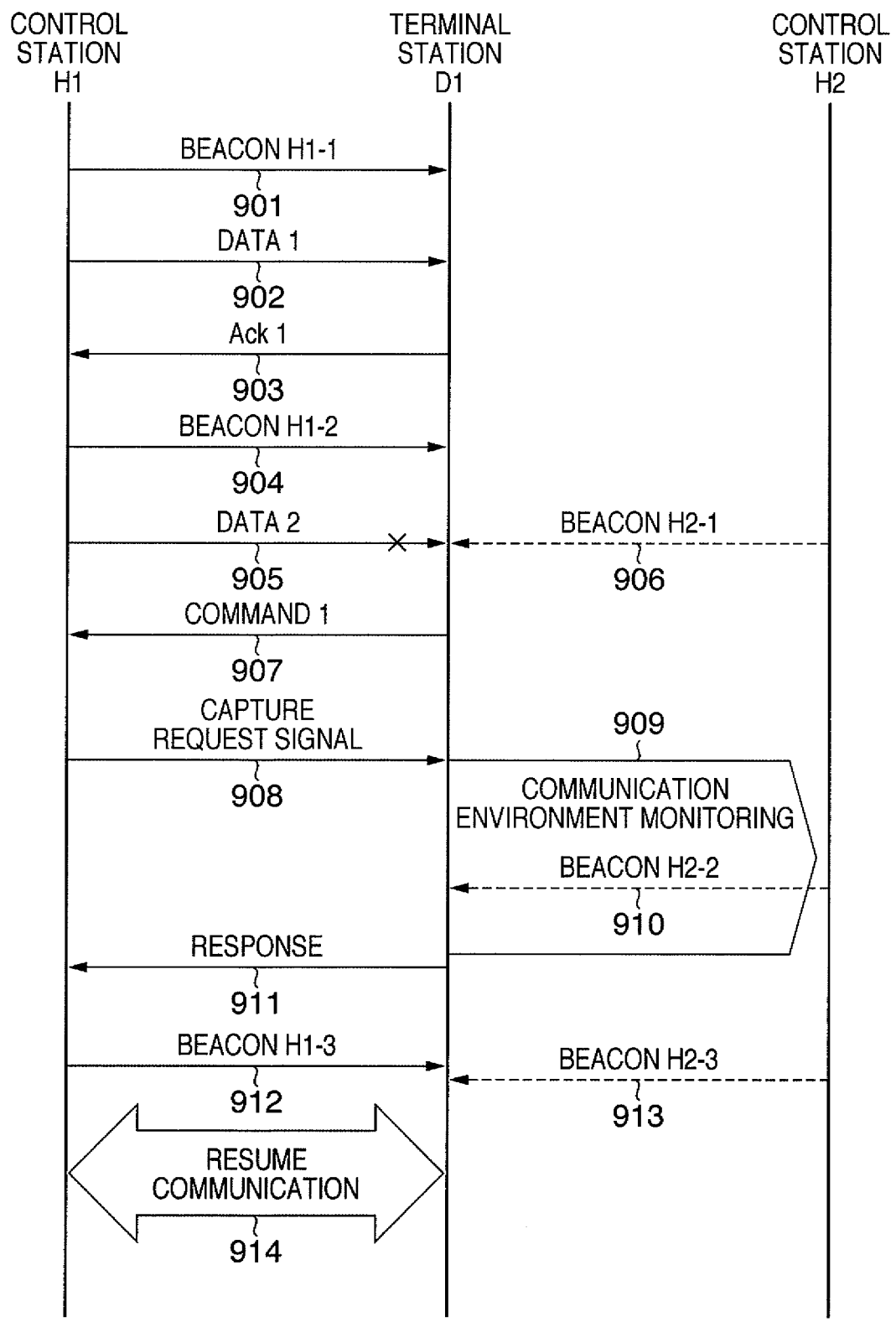
FIG. 9 is a diagram illustrating a sequence executed by wireless stations according to the third embodiment of the present invention.

FIG. 9 is a diagram illustrating another example in which the terminal station D1 sends a command 1. FIG. 9 illustrates a situation in which the terminal station D1 sends a command 1 when it cannot properly receive data that is sent from the control station H1.

The control station H1 periodically sends a beacon (901, 904). The beacon includes information such as a bandwidth assigned for data transmission from the control station H1 to the terminal station D1, a bandwidth assigned for data transmission from the terminal station D1 to the control station H1, and the like. The control station H1 and the terminal station. D1 perform data communication based on the bandwidth information (902, 903, 905).

First, based on the bandwidth information included in a beacon H1-1 (901), data 1 is sent from the control station H1 to the terminal station D1 (902) been receiving the data 1, the terminal station D1 sends an ACK 1 to the control station H1 (903).

Next, based on the bandwidth information included in a beacon H1-2 (904), data 2 is sent from the control station H1 to the terminal station D1 (905). At this time, it is assumed that the data 2 has collided with a beacon H2-1 (906) sent from the control station H2, and the terminal station D1 could not receive the data 2 properly.

If the terminal station D1 could not receive the data 2 properly, the terminal station D1 sends a command 1 to the control station H1 (907). Upon receiving the command 1, the control station H1 sends a capture request signal to the terminal station D1 (908). Upon receiving the capture request signal, the terminal station D1 captures a beacon sent by another station, and monitors the communication environment (909). In the present embodiment, the terminal station D1 receives a beacon H2-2 (910) sent by the control station H21, and returns information regarding the received beacon to the control station H1 (911).

The control station H1 arranges a bandwidth in which the control station in sends beacons and data to the terminal station D1 based on the information returned from the terminal station D1 such that the bandwidth does not overlap with a bandwidth in which the control station H2 sends beacons (906, 910, 913). The control station H1 sends a beacon H1-3 that includes information regarding the arranged bandwidth to the terminal station D1 (912), and resumes wireless communication with the terminal station D1 that has received the beacon H1-3 (914).

In this manner, upon failure to correctly receive data from the control station H1, the terminal station D1 sends a command 1 to the control station H1, and the control station H1 sends a capture request signal in response to the command 1. Consequently, effects similar to those of Embodiment 2 can be attained.

Figure 10:
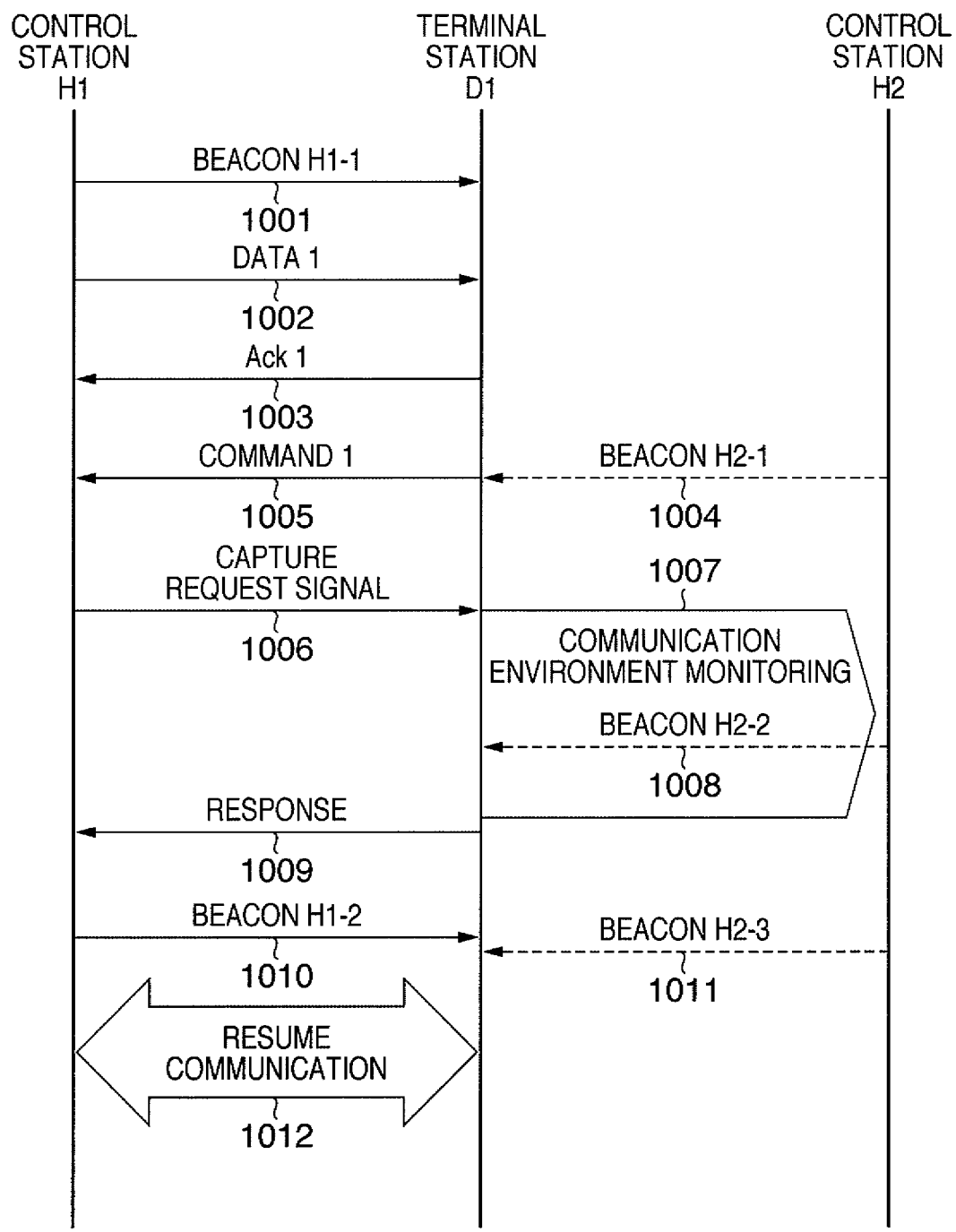
FIG. 10 is a diagram illustrating a sequence executed by wireless stations according to Embodiment 3 of the present invention.

FIG. 10 is a diagram illustrating another example in which the terminal station D1 sends a command 1. The present embodiment describes a configuration in which the terminal station D1 sends a command 1 when it has detected a beacon sent from a control station other than, its communication partner, the control station H1.

The control station H1 periodically sends a beacon (1001). The beacon includes information such as a bandwidth ansa for data transmission from the control station H1 to the terminal station D1, a bandwidth assigned for data transmission from the terminal station D1 to the control station H1, and the like. The control station H1 and the terminal station D1 perform data communication based on the bandwidth information (1002, 1003).

If the terminal station D1 detects a beacon H2-1 sent by the control station H2 (1004) at this time, the terminal station D1 sends a command 1 to the control station H1 (1005). Upon receiving the command the control station H1 sends a capture request signal to the terminal station D1 (1006). Upon receiving she capture request signal, the terminal station D1 captures a beacon sent by another station, and monitors the communication environment (1007). In the present embodiment, the terminal station D1 receives a beacon H2-2 (1008) sent by the control station H2, and returns information regarding the received beacon to the control station H1 (1009).

The control station H1 arranges a bandwidth in which the control station H1 sends beacons and data to the terminal station D1 based on the information returned from the terminal station D1 such that the bandwidth does not overlap with a bandwidth in which the control station H2 sends beacons (1004, 1008, 1011). The control station H1 sends a beacon H1-2 that includes information regarding the arranged bandwidth to the terminal station D1 (1010), and resumes wireless communication with the terminal station D1 that has received the beacon H1-2 (1012).

In this manner, upon detecting a beacon sent from the control station H2, the terminal station D1 sends a command 1 to the control station H1, and the control station H1 sends a capture request signal in response to the command 1. Consequently, it is possible to prevent the signals sent from the control station H1 to the terminal station D1 from colliding with the beacons sent, from the control station H2.

As described above, accordion to the present embodiment, the control station H1 sends a capture request signal in response to the command 1 sent from the terminal station D1. Even when the control at H1 does not have a function for controlling the timing of sending a capture request signal as described in Embodiments 1 and 2, by adding the function described in the present embodiment to the terminal station and configuring the control station to be able to interpret the command 1 sent from the terminal station, it is possible to attain effects similar to those of Embodiments 1 and 2.

A wireless LAN access point and a station, or a wireless USE host and device, can be given as examples of the control station and the terminal station described in the above embodiments.

Embodiments 1 and 3 discuss operations performed when the terminal station makes a new wireless connection to the control station, but these embodiments are also applicable to the case where the terminal station or the control station wakes up from a standby mode (i.e., when the mode is changed from a power-saving mode to a normal mode) and the case where the terminal station reconnects to the control station.

It should be noted that the object of the present invention can also be achieved by supplying a system or an apparatus with a recording medium in which a software computer program that realizes the function of the above-mentioned embodiments is recorded, and a computer (CPU or MPU) of the system or apparatus loading and executing the computer program stored in the recording medium.

In this case, the computer program itself loaded from the recording medium realizes the function of the above-mentioned embodiments, and the present invention is configured of the recording medium in which the computer program is stored.

Examples of recording media that can be used for supplying the computer program include Floppy® disks, hard disks, optical, disks, magneto-optical disks, CD-ROMS, CD-Rs, magnetic tape, non-volatile type memory cards and ROMs.

The function of the above-mentioned embodiments can be realized not only by executing a computer program loaded by a computer. That is, the case where an operating system (OS) running in a computer performs part or all of the actual processing based on the instructions of the computer program, and the function of the above-mentioned embodiments is realized by that processing, is included in the scope of the present invention.

Further, the present invention can also be applied in the case where the computer program loaded from the recording medium is written into a memory provided in a function expansion board installed in the computer or a function expansion unit connected to the computer. In such a case, a CPU or the like provided in the function expansion board or the function expansion unit performs part or all, of the actual processing based on the instructions of the computer program, and the function of the above-mentioned embodiment is realized by that processing.

As described above, according to the embodiments given above, the control station causes the terminal station to capture a beacon sent by another station, and controls data communication with the terminal station based on the captured information. Accordingly, even when another station is present in a range in which the control station cannot communicate, the control station can recognize the presence of that station. By performing control on the assignment of a communication bandwidth based on the captured information, the degradation of data communication quality due an interference signal originating from the station can be suppressed.

According to the foregoing descriptions, the control station performs wireless connection processing for connecting to the terminal station, and when the wireless connection is established, the control station sends a capture request signal for causing the terminal station wirelessly connected to the control station to capture a control signal sent by another station and return information regarding the captured control signal. Thereby, the control station can be aware of the presence of another station that is located on a range in which the control station cannot communicate, before commencing wireless communication.

Further, the control station sends a control signal that includes information regarding a bandwidth assigned for data communication with the wirelessly-connected terminal station, and transmits data to the terminal station in the assigned bandwidth. If the control station cannot receive an acknowledgement signal in response to the data transmitted, the control station sends, to the terminal station, a capture request signal for causing the terminal station to capture a control signal sent by another station and return information regarding the captured control signal. Thereby, even if the control station cannot receive an acknowledgment signal, the control station can be aware of the communication environment out of range of the control station.

Further, the control station sends a control signal including information regarding a bandwidth assigned for data communication with the wirelessly-connected terminal station, and returns an acknowledgment signal if receiving data from the terminal station in the assigned bandwidth. If the control station receives retransmission data from the terminal station after having returned the acknowledgment signal, the control station sends, to the terminal station, a capture request signal for causing the terminal station to capture a control signal sent by another station and return information regarding be captured control signal. Accordingly, even if data is retransmitted despite the fact that the terminal station has sent an acknowledgment signal, the control station can be aware of the communication environment out of range of the control station.

Further, the control station determines a bandwidth to be assigned for data communication with the terminal station based on the information returned in response to the capture request signal, and sends control signal including information regarding the determined bandwidth. Thereby, the control station can determine a communication bandwidth that will not interfere with the data communication of another station located on a range in which the control station cannot communicate.

The information that the terminal station having received the capture request signal monitors includes at least one of the content of a control signal received by the terminal station from another station, the timing at which the signal was received, and the quality of the reception.

The terminal station performs wireless connection processing with the control station having a function for sending a capture request signal for causing the terminal station to capture a control sent by another station and return information regarding the captured control signal. Upon establishing the wireless connection, the terminal station sends, to the control station, a signal for causing the control station to send a capture request signal. Thereby, the control station can send the capture request signal based on the instruction from the terminal station before commencing wireless communication.

The terminal station receives a control signal including information regarding a bandwidth assigned for data communication with the control station from the control station having a function for sending a capture request signal for causing the terminal station to capture a control signal sent, by another station and return information regarding the captured control signal. If the terminal station cannot receive data from the control station in the assigned bandwidth, the terminal station sends a signal for causing the control station to send a capture request signal. Thereby, even when the communication environment of the terminal station is poor, the terminal station can issue an instruction to send a capture request signal, to the control station.

The terminal station also receives a control signal including information regarding a bandwidth assigned for data communication with the control at from the control station having a function for sending a capture request signal for causing the terminal station to capture a control signal sent by another station and return information regarding the captured control signal. If the terminal station detects a control signal from a control station other than the above-mentioned control, station, the terminal station sends a signal for causing the control station to send a capture request signal. Thereby, when the terminal station has detected the presence of a control station with which the terminal station does not wish to communicate, the terminal station can issue, an instruction to send a capture request signal to the control station.

As described above, according to the present invention, the control station sends a capture request signal to toe terminal station at an appropriate time, whereby the control station can recognize a communication environment out of the range of the control station.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-152708, flied on Jun. 8, 2007, which is hereby incorporated by reference herein in its entirety.

What is claimed is:

1. A control method of a communication apparatus, which wirelessly communicates with a terminal station, said method comprising the steps of:
sending a predetermined signal to cause the terminal station to return information regarding a control signal sent by another communication apparatus in a case that wireless communication between the communication apparatus and the terminal station failed; and
notifying a bandwidth to be assigned for wireless communication between the communication apparatus and the terminal station based on the information returned from the terminal station in response to the predetermined signal.

2. The method according to claim 1, wherein the wireless communication between the communication apparatus and the terminal station is determined to have failed in a case that the communication apparatus, after transmitting data to the terminal station, fails to receive a response signal corresponding to the data transmission from the terminal station.

3. The method according to claim 1, wherein the wireless communication between the communication apparatus and the terminal station is determined to have failed in a case that the communication apparatus, after the communication apparatus transmits a response signal in response to reception of data from the terminal station, receives said data retransmitted from the terminal station.

4. The method according to claim 1, wherein the information includes at least one of content of the control signal, reception timing of the control signal and reception quality of the control signal.

5. A communication apparatus, which wirelessly communicates with a terminal station, the apparatus comprising:
a memory and
a processor
wherein the processor controls a wireless communication interface to send a predetermined signal to cause the terminal station to return information regarding a control signal sent by another communication apparatus in a case that wireless communication between the communication apparatus and the terminal station failed; and
wherein the processor controls a wireless communication interface to notify a bandwidth to be assigned for wireless communication between the communication apparatus and the terminal station based on the information returned from the terminal station in response to the predetermined signal.

6. A non-transitory computer-readable storage medium storing a computer program for causing a computer to perform the step of:

controlling a wireless communication interface to send a predetermined signal to cause the terminal station to return information regarding a control signal sent by another communication apparatus in a case that wireless communication between the communication apparatus and the terminal station failed; and controlling a wireless communication interface to notify a bandwidth to be assigned for wireless communication between the communication apparatus and the terminal station based on the information returned from the terminal station in response to the predetermined signal.

\* \* \* \* \*